US007631215B2

(12) United States Patent
Ikehara et al.

(10) Patent No.: US 7,631,215 B2
(45) Date of Patent: Dec. 8, 2009

(54) PERSONAL DIGITAL ASSISTANT AND DATA RECOVERY METHOD

(75) Inventors: Kiyoshi Ikehara, Yokohama (JP); Kenji Kitagawa, Yokohama (JP); Yoshiaki Morimoto, Kawasaki (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 708 days.

(21) Appl. No.: 11/301,884

(22) Filed: Dec. 13, 2005

(65) Prior Publication Data

US 2006/0154692 A1 Jul. 13, 2006

(30) Foreign Application Priority Data

Dec. 15, 2004 (JP) ............................ 2004-363447

(51) Int. Cl.
*G06F 11/00* (2006.01)

(52) U.S. Cl. ............................ 714/5; 714/15; 455/419

(58) Field of Classification Search .................... 714/5, 714/15; 455/419
See application file for complete search history.

(56) References Cited

U.S. PATENT DOCUMENTS

| | | | | |
|---|---|---|---|---|
| 6,182,057 | B1 | 1/2001 | Kikuchi et al. | |
| 6,662,023 | B1* | 12/2003 | Helle | 455/558 |
| 6,804,699 | B1* | 10/2004 | Henrie | 709/203 |
| 6,813,487 | B1* | 11/2004 | Trommelen | 455/404.1 |
| 7,107,349 | B2* | 9/2006 | Britt, Jr. | 709/229 |
| 2002/0073314 | A1* | 6/2002 | Bhat | 713/167 |
| 2004/0137893 | A1* | 7/2004 | Muthuswamy et al. | 455/419 |
| 2005/0153685 | A1* | 7/2005 | Choi | 455/411 |
| 2006/0031541 | A1* | 2/2006 | Koch et al. | 709/229 |
| 2006/0156052 | A1* | 7/2006 | Bodnar et al. | 714/2 |

FOREIGN PATENT DOCUMENTS

| | | |
|---|---|---|
| JP | 07-193865 | 7/1995 |
| JP | 09-215057 | 8/1997 |
| JP | 10-228460 | 8/1998 |
| JP | 11-098555 | 4/1999 |
| JP | 11-187038 | 7/1999 |
| JP | 2000-029858 | 1/2000 |
| JP | 2000-308126 | 11/2000 |
| JP | 2001-275163 | 10/2001 |

(Continued)

OTHER PUBLICATIONS

JPO machine translation of Japan Patent Publication No. 2000-308126.*
Office Action (with English translation) dated Feb. 1, 2008 issued for the corresponding Chinese Patent Application No. 200510136948.0.

(Continued)

*Primary Examiner*—Philip Guyton
(74) *Attorney, Agent, or Firm*—Cohen Pontani Lieberman & Pavane LLP

(57) ABSTRACT

A personal digital assistant comprises a loss detector to detect a lost state and a value information retainer for retaining a value assessment index, which are numerical values indicating data values. When a lost state is detected by the loss detector, a data recovery sequence is determined based on the data values and data is transmitted to another terminal. In determining the recovery sequence, electrical energy required for data transmission is calculated using a power consumption table and the remaining battery power level measured by a remaining battery power level meter is referenced.

27 Claims, 13 Drawing Sheets

FOREIGN PATENT DOCUMENTS

| | | |
|---|---|---|
| JP | 2002-325280 | 11/2002 |
| JP | 2002-351720 | 12/2002 |
| JP | 2002-369251 | 12/2002 |
| JP | 2003-069699 | 3/2003 |
| JP | 2004-326156 | 11/2004 |

OTHER PUBLICATIONS

Office Action (with English translation) dated Mar. 3, 2008 issued for the corresponding Japanese Patent Application No. 2004-363447.

Office Action issued for Korean Patent Application No. 10-2005-0122855, See English translation.

* cited by examiner

| DATA NAME | DATA CLASSIFICATION | RECOVERY FLAG | VALUE ASSESSMENT INDEX (YEN) | SIZE (k) |
|---|---|---|---|---|
| PICTURE 1 | JPEG IMAGE | TO BE RECOVERED | 1000 | 100 |
| PICTURE 2 | JPEG IMAGE | NOT TO BE RECOVERED | UNSET | 50 |
| DOCUMENT 1 | AP DATA | NOT TO BE RECOVERED | 500 | 300 |

FIG. 5

| DATA NAME | DATA CLASSIFICATION | RECOVERY FLAG | VALUE ASSESSMENT INDEX (YEN) | SIZE (k) |
|---|---|---|---|---|
| PICTURE 1 | JPEG IMAGE | TO BE RECOVERED | 1000 | 100 |
| PICTURE 2 | JPEG IMAGE | NOT TO BE RECOVERED | UNSET | 50 |
| DOCUMENT 1 | AP DATA | NOT TO BE RECOVERED | 500 | 300 |
| ADDRESS BOOK 1 | ADDRESS BOOK | TO BE RECOVERED | 10000 | 50 (ENTRIES) |
| BUS FARE | PREPAID (A) | TO BE RECOVERED | 4000 | — |

FIG. 6

| DATA CLASSIFICATION | BASIC ELECTRIC ENERGY (mWh) | ELECTRIC ENERGY PER SIZE |
|---|---|---|
| PREPAID (A) | 10 | — |
| PREPAID (B) | 30 | — |
| POINT (A) | 40 | — |
| JPEG IMAGE | 0 | 0.1(mWh/k) |
| AAC SOUND | 0 | 0.1(mWh/k) |
| PNG IMAGE | 0 | 0.1(mWh/k) |
| ADDRESS BOOK | 10 | 1.0(mWh/k) |
| AP DATA | 0 | 0.1(mWh/k) |

FIG. 14

| DATA NAME | DATA CLASSIFICATION | RECOVERY FLAG | VALUE ASSESSMENT INDEX (YEN) | SIZE (k) | COMPRESSION PARAMETER |
|---|---|---|---|---|---|
| PICTURE 1 | JPEG IMAGE | TO BE RECOVERED | 1000 | 100 | 10% |
| PICTURE 2 | JPEG IMAGE | NOT TO BE RECOVERED | UNSET | 50 | 20% |
| DOCUMENT 1 | AP DATA | NOT TO BE RECOVERED | 500 | 300 | — |
| CUSTOMER ADDRESS BOOK 1 | ADDRESS BOOK | TO BE RECOVERED | 10000 | 50 (ENTRIES) | — |
| BUS FARE | PREPAID (A) | TO BE RECOVERED | 4000 | — | — |

FIG. 15

| DATA CLASSIFICATION | BASIC ELECTRIC ENERGY (mWh) | ELECTRIC ENERGY PER SIZE | ELECTRIC ENERGY REQUIRED FOR PREPARATION OF RECOVERY DATA | |
|---|---|---|---|---|
| | | | (DECOMPRESSION) | (COMPRESSION) |
| PREPAID (A) | 10 | — | — | — |
| PREPAID (B) | 30 | — | — | — |
| POINT (A) | 40 | — | — | — |
| JPEG IMAGE | 0 | 0.1(mWh/k) | 0.004(mWh/k) | 0.008(mWh/k) |
| AAC SOUND | 0 | 0.1(mWh/k) | 0.002(mWh/k) | 0.004(mWh/k) |
| PNG IMAGE | 0 | 0.1(mWh/k) | 0.001(mWh/k) | 0.002(mWh/k) |
| ADDRESS BOOK | 10 | 1.0(mWh/k) | — | — |
| AP DATA | 0 | 0.1(mWh/k) | — | 0.002(mWh/k) |

PERSONAL DIGITAL ASSISTANT AND DATA RECOVERY METHOD

CROSS-REFERENCE TO RELATED APPLICATION

This application is based upon and claims the benefit of priority from the prior Japanese Patent Application No. 2004-363447 filed Dec. 15, 2004, the entire contents of which is incorporated herein by reference.

BACKGROUND OF THE INVENTION

1. Field of the Invention

The present invention relates to a Personal Digital Assistant (hereinafter referred to as PDA) and a data recovery method where internally stored data is recoverable when lost.

2. Description of the Related Art

When a PDA is lost, data stored in the PDA is also lost. Conventionally, when a PDA equipped with a wireless communication function is lost, consideration is given to a method for protecting the data in the PDA from recovery or deletion.

As conventional prior art regarding a data recovery method at the time a PDA is lost, a portable information device and data saving method which performs data protection and security protection by transmitting important data within a device using wireless communication when theft or loss of a PDA is detected has been proposed (for example, refer to Japanese Laid-Open (Kokai) Patent Application No. 2002-325280 titled "PORTABLE INFORMATION APPARATUS HAVING DATA SAVING FUNCTION AND DATA SAVING METHOD").

Moreover, in other conventional prior art regarding the determining method of priority sequence of data recovery in the case of backup, a PIM data management unit and management method in which a user can use a PIM function without being concerned of the date of data backup or memory capacity in a mobile communication terminal have already been disclosed (for example, Japanese Laid-Open (Kokai) Patent Application No. 2002-351720 titled "SYSTEM/METHOD FOR NETWORK DATA MANAGEMENT, NETWORK MANAGEMENT PROGRAM AND RECORDING MEDIUM WITH NETWORK MANAGEMENT PROGRAM RECORDED THEREON").

However, in the above-stated conventional prior art, although the priority sequence is automatically determined according to alternative selections as to whether or not data is subject to recovery or based on a time stamp such as the date of the data, correction, reference, etc., there is the problem that the data is not always recovered as intended by the user.

In particular, for data such as pictures taken by a camera, a user's subjective evaluation relating to the details of the pictures, such as the individual or object comprising the imaging subject, is more important than the date or reference when the picture was taken. However, an evaluation based on information contained in the data or metadata accompanying the data is not always appropriate.

When priority is calculated based on data-specific information, the priority sequence will be calculated using a different index for each data classification, such as pictures, sound and text, making it difficult to compare between data classifications.

SUMMARY OF THE INVENTION

The object of the present invention is to provide a personal digital assistant and data recovery method in which the priority sequence of data recovery is controlled with a single index and, based on a single index, the data can be efficiently recovered using limited electrical energy.

To achieve the above-mentioned object, the personal digital assistant according to the present invention is a battery-driven personal digital assistant which wirelessly communicates with other terminals, comprising a memory means for storing data; a loss detection means for detecting if the personal digital assistant is in a lost state; a value information retention means for retaining a value assessment index indicating values of data stored in the memory means; a recovery sequence determination means for determining a recovery sequence of data stored in the memory means based on the value assessment index retained in the value information retention means when a lost state is detected by the loss detection means; and a transmission means for transmitting data stored in the memory means to another terminal based on the recovery sequence determined by the recovery sequence determination means.

To achieve the above-mentioned object, the present invention provides a data recovery method for recovering data within a personal digital assistant by wirelessly transmitting data to another terminal when in a lost state, comprising the steps of determining a data recovery sequence based on a value assessment index indicating data values when detected in a lost state; and transmitting data to another terminal based on the determined recovery sequence.

According to the present invention, the advantage that essential data can be preferentially protected by recovering in order highly valuable data is acquired based on a value assessment index which contains numerical values indicating data values.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a conceptual illustration showing the data configuration of the value information retainer 115 according to the second embodiment;

FIG. 6 is a conceptual illustration showing the data configuration of a power consumption table 104 according to the second embodiment;

FIG. 14 is a conceptual illustration showing the data configuration of the value information retainer 115 according to the fifth embodiment;

FIG. 15 is a conceptual illustration showing the data configuration of the power consumption table 104 according to the fifth embodiment.

DETAILED DESCRIPTION OF THE PREFERRED EMBODIMENTS

Hereinafter, the embodiments of the present invention will be described with reference to the drawings.

A. First Embodiment

A-1. Configuration in the First Embodiment

Figure 1:
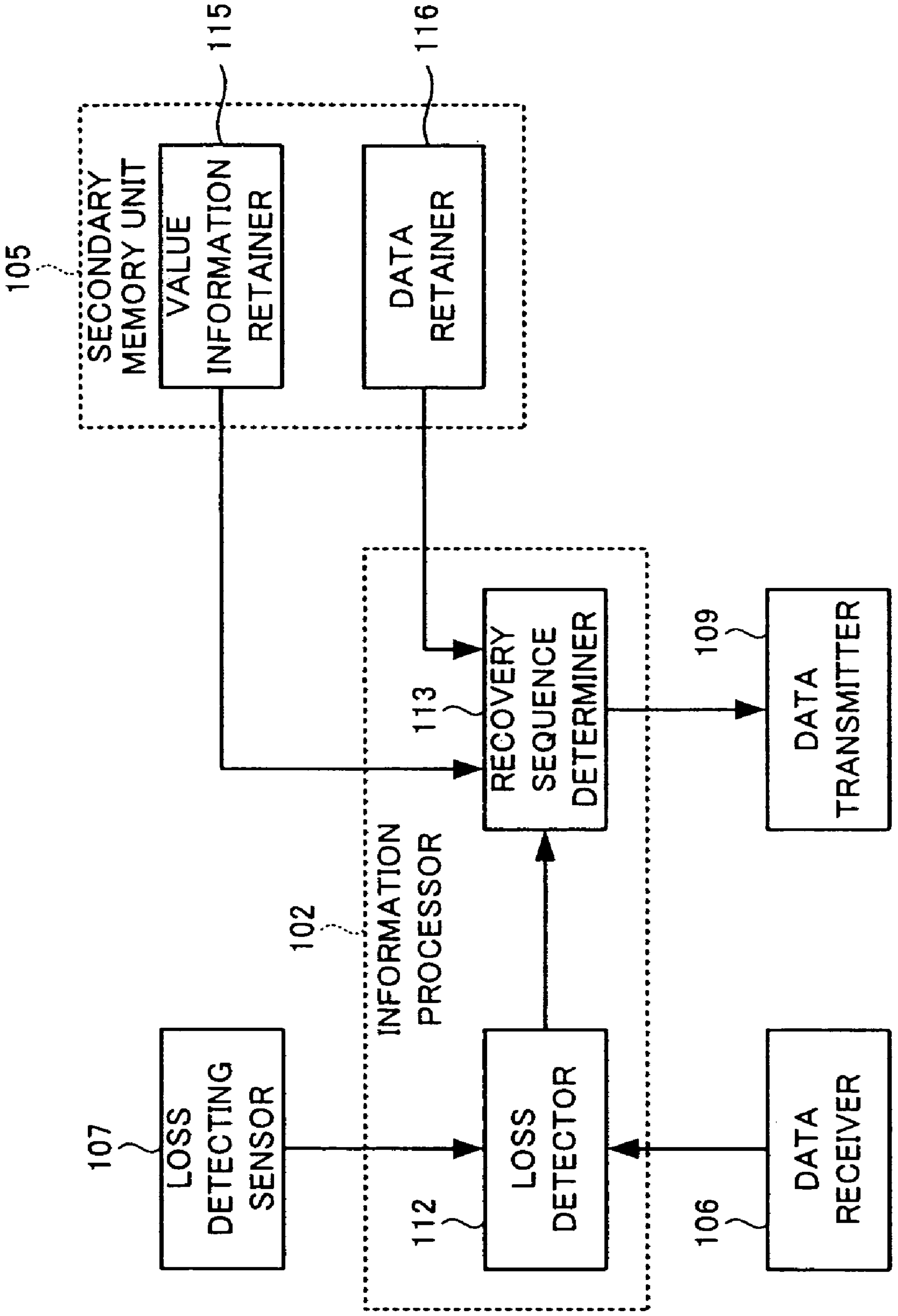
FIG. 1 is a block diagram showing the configuration of a PDA according to the first embodiment of the present invention.

FIG. 1 is a block diagram showing the configuration of a PDA according to the first embodiment of the present invention. In the diagram, a data receiver 106 externally receives loss notification via a wireless circuit and provides notification to a loss detector 112. Loss detection sensor 107 is a sensor in which the PDA itself automatically detects a lost state and a loss notification is supplied to the loss detector 112. As the loss detection sensor 107, various devices with different configurations, such as those for detecting a standstill state at a certain location for an extended time using a GPS (Global Positioning System), are usable.

Figures 2, 3:
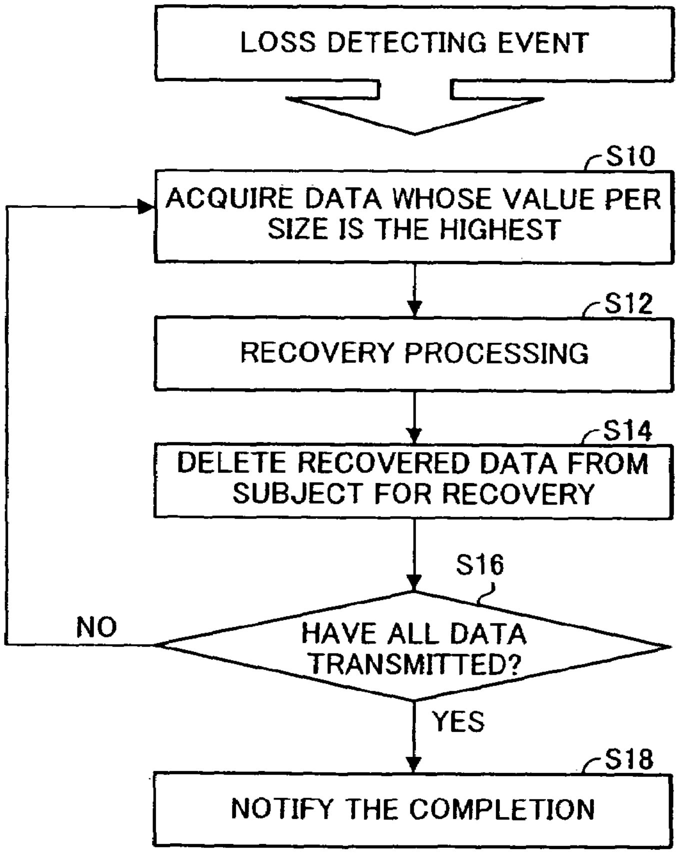
FIG. 2 is a conceptual illustration showing the data configuration of a value information retainer 115 according to the first embodiment.
FIG. 3 is a flowchart describing data recovery procedures according to the first embodiment.

A secondary memory unit 105 is composed of the value information retainer 115 and a data retainer 116. The value information retainer 115 is a table for retaining metadata relating to values for data stored in the data retainer 116. As shown in FIG. 2, it is composed of a data name, data classification, a recovery flag indicating whether it is a subject for recovery, a value assessment index and size. The data retainer 116 retains various data such as pictures and documents.

The loss detector 112 receives the loss notification from the loss detection sensor 107 or from another terminal via the data receiver 106 so as to detect the lost state of the PDA. A recovery sequence determiner 113 commences operation when the loss detector 112 detects a lost state and in reference to the value information retainer 115, determines the recovery sequence of the data stored in the data retainer 116. A data transmitter 109 transmits various data retained in the data retainer 116 externally by following the recovery sequence determined by the recovery sequence determiner 113.

Furthermore, the recovery sequence determiner 113 and the loss detector 112 are respectively expressed as independent blocks in the information processor 102. However, if they are implemented as software, they may be a single program.

A-2. Operation in First Embodiment

Data recovery according to the first embodiment is described next. Here, FIG. 3 is a flowchart describing data recovery procedures according to the first embodiment. When the loss detector 112 detects a lost state, the information processor 102 refers to the value information retainer 115 and selects data having the highest value per size (unit value) from among the data subject for the recovery (Step S10) Next, the selected data is extracted from the data retainer 116 and transmitted to another terminal via the data transmitter 109 (Step S12). Transmission can be done by any recognized procedure. For example, if the classification of the data to be recovered is for example, picture, sound or text, the data can be transmitted to a predestinated destination via electronic mail. Alternatively, if the classification of the data to be recovered is electronic money, a prepaid point or copyright-controlled data, transaction processing can be performed in communication with another terminal.

Next, clearing the recovery flag in the value information retainer 115 excludes transmission completed data from a subject for recovery (Step S14). Under these circumstances, transmission completed data can be deleted from the data retainer 116. Next, reference is made to the value information retainer 115 and a determination is made as to whether data subject for recovery still exists, i.e., whether the data subject for recovery has been entirely transmitted (Step S16). If data still exists, the process returns to Step S10 and recovery processing is continued. If there is no existent data, notification of recovery completion is sent to another terminal via the data transmitter 109 which completes the processing (Step S18). Completion notification includes information relating to recovery processing such as a list of transmitted data.

B. Second Embodiment

Next, the second embodiment of the present invention is described.

B-1. Configuration in Second Embodiment

Figure 4:
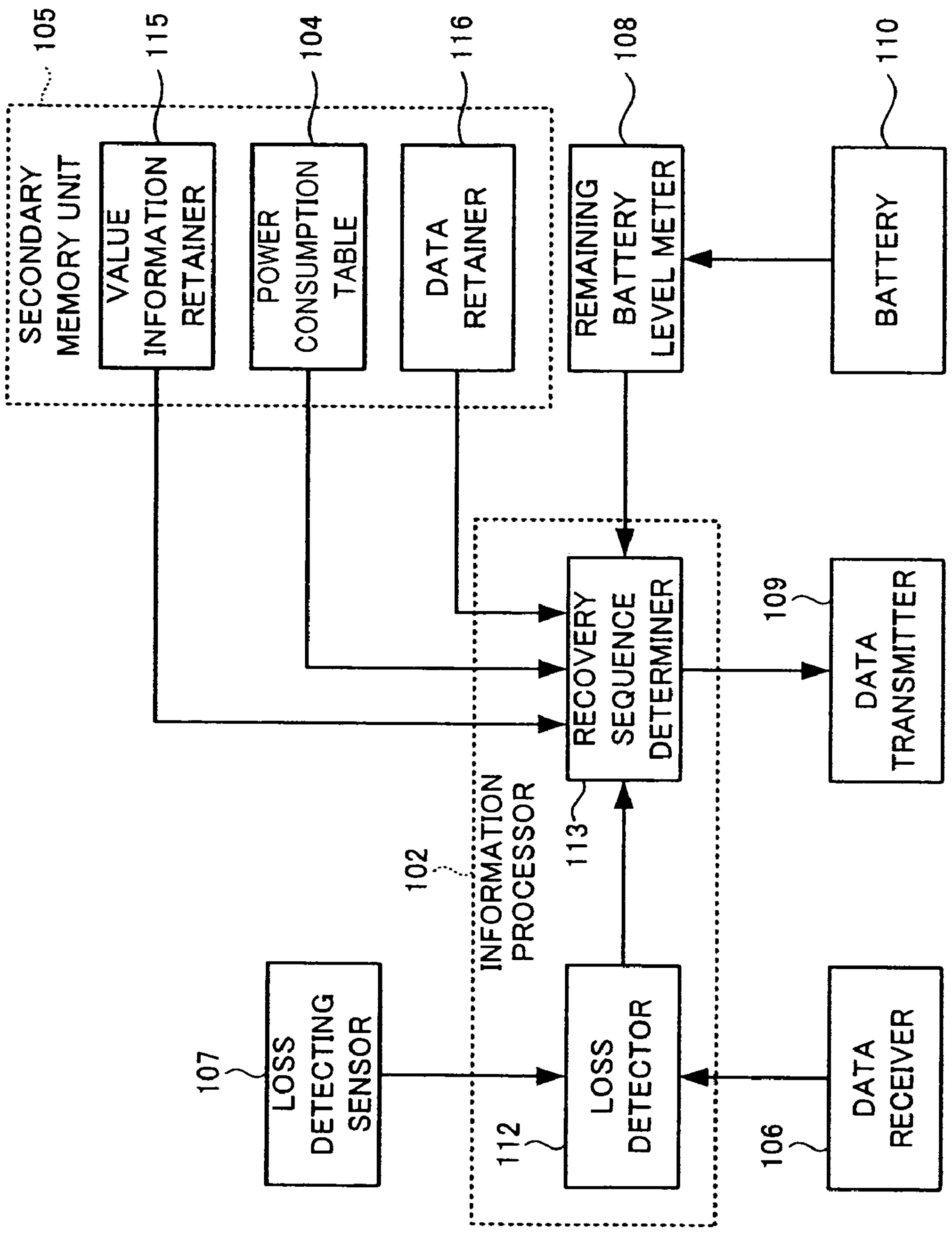
FIG. 4 is a block diagram showing the configuration of a PDA according to the second embodiment of the present invention.

FIG. 4 is a block diagram showing the configuration of a PDA according to the second embodiment of the present invention. Components respectively corresponding to those in FIG. 1 are marked with the same symbols and their descriptions are omitted. In FIG. 4, a battery 110 supplies electric power for driving each component. A remaining battery power level meter 108 measures the remaining power level of the battery 110 and provides notification of the remaining power level to the recovery sequences determiner 113. The value information retainer 115 is a table for retaining metadata relating to the values of the data stored in the data retainer 116, and as shown in FIG. 5, is composed of a data name, data classification, a recovery flag indicating whether the data is subject for recovery, a value assessment index and size.

The power consumption table 104 is, as shown in FIG. 6, composed of data classification, basic electrical energy and electrical energy per size. The electrical energy required for the data recovery is the sum of basic electrical energy corresponding to the classification of the data and the value where the electrical energy per size is multiplied by the capacity of the data to be recovered. Furthermore, the values in each column for the basic electrical energy and the electrical energy per size retained in the power consumption table 104 are values measured under specified conditions such as the assumption of excellent conditions for a channel in a wireless communication means. Prior to calculation, the values in the power consumption table 104 are multiplied by a coefficient according to the quality of the channel.

The recovery sequence determiner 113 commences operation when the loss detector 112 detects a lost state, acquires the remaining battery power level from the remaining battery power level meter 108, calculates the electrical energy required for recovery with reference to the power consumption table 104 and determines the recovery sequence of the data stored in the data retainer 116 with reference to the value information retainer 115.

Although the recovery sequence determiner 113 and the loss detector 112 are expressed as independent blocks within the information processor 102, they may be a single program when actualized as software.

B-2. Operation in Second Embodiment (No. 1)

Figure 7:
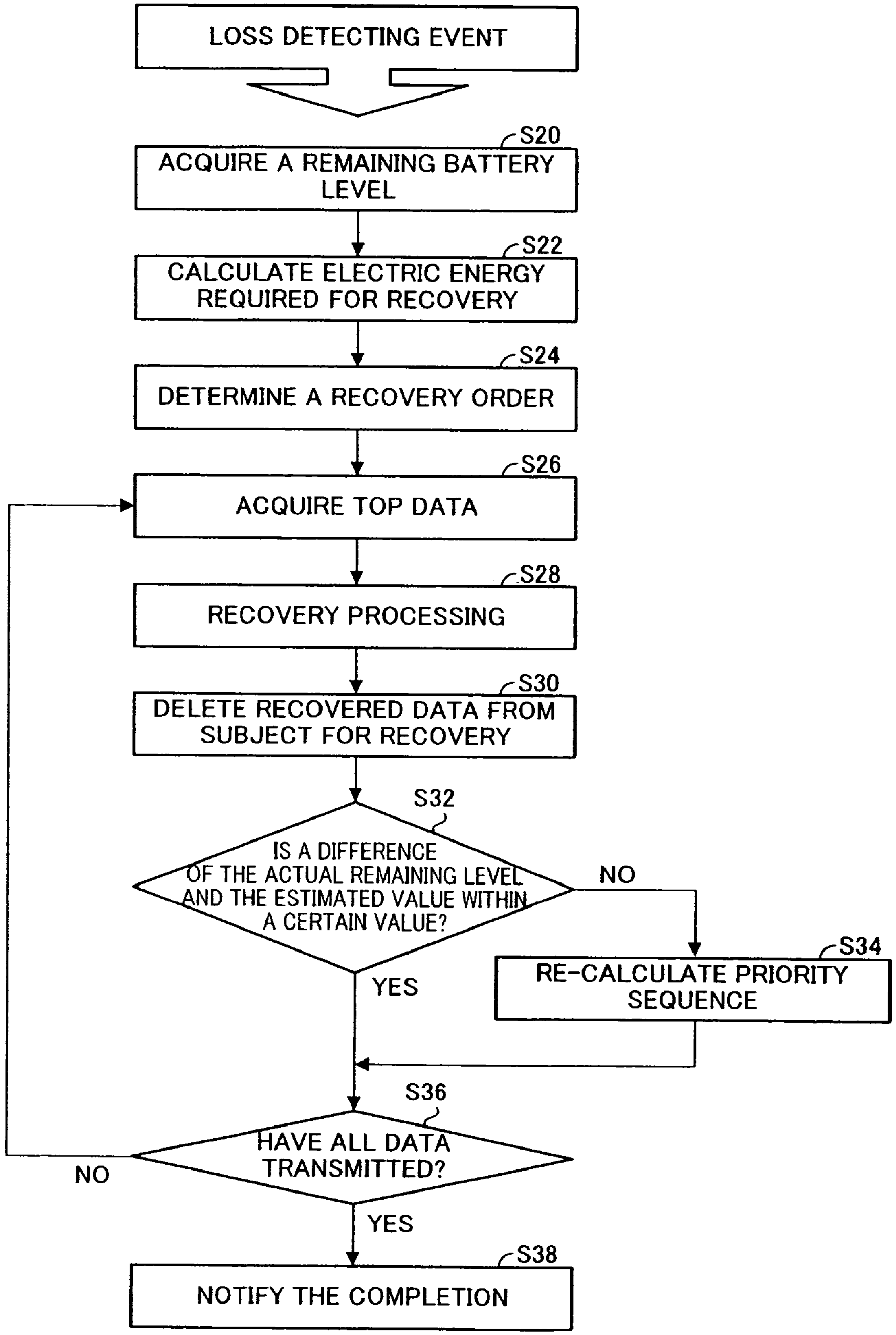
FIG. 7 is a flowchart describing data recovery procedures (No. 1) according to the second embodiment.

Next, data recovery according to the second embodiment will be described. Here, FIG. 7 is a flowchart describing data recovery procedures according to the second embodiment. When the loss detector 112 detects a lost state, the information processor 102 acquires the remaining battery power level of the battery 110 using the remaining battery power level meter 108 (Step S20). Next, reference is made to the power consumption table 104 and an estimated value for the electrical energy required for recovering the data stored in the data retainer 116 is calculated (Step S22).

The recovery sequence is determined based on the calculated electrical energy and value assessment index added to the data (Step S24). As the determination method for the recovery sequence, the order is determined by solving a "knapsack problem" using the remaining battery power level as the capacity, the power consumption as weight and the amount of money attached to the data as a value. Alternatively, they can be simply set in the order of value per electrical energy with the highest coming first.

Next, following the determined recovery sequence, chronologically set top data is acquired from among chronologically set data (Step S26). Then, the top data is extracted from the data retainer 116 and transmitted to another terminal via the data transmitter 109 (Step S28). Next, clearing the recovery flag in the value information retainer 115 excludes the data where the transmission is completed from the subject for recovery (Step S30). Under these circumstances, transmission completed data can be deleted from the data retainer 116.

Next, a determination is made (Step S32) as to whether a difference between an actual value of the remaining battery power level (the remaining battery power level according to the remaining battery power level meter 108) and an estimated value (a remaining battery power level obtained from the power consumption table 104) exceeds a specified value. If the difference exceeds the specified value, the recovery sequence is recalculated in a manner similar to Step S24 (Step S34). Reference is then made to the value information retainer 115 and a determination is made (in Step S36) as to whether there is existent data subject to recovery, i.e., whether the data subject to recovery has entirely been transmitted. If untransmitted data still exists, the process returns to Step S26 and recovery processing is continued. In this case, the data is transmitted according to a recalculated recovery sequence.

In the meantime, if the difference does not exceed a certain value, direct reference is made to the value information retainer 115 and a determination is made (in Step S36) as to whether data subject for recovery still exists, i.e., whether the data subject for recovery has entirely been transmitted. If untransmitted data exists, the process returns to Step S26 and recovery processing is continued.

In either case, if no untransmitted data exists, notification of recovery completion is communicated to another terminal via the data transmitter 109 and processing is completed (in Step S18). The completion notification includes information relating to recovery processing such as a list of transmitted data.

B-3. Operation in the Second Embodiment (No. 2)

Figure 8:
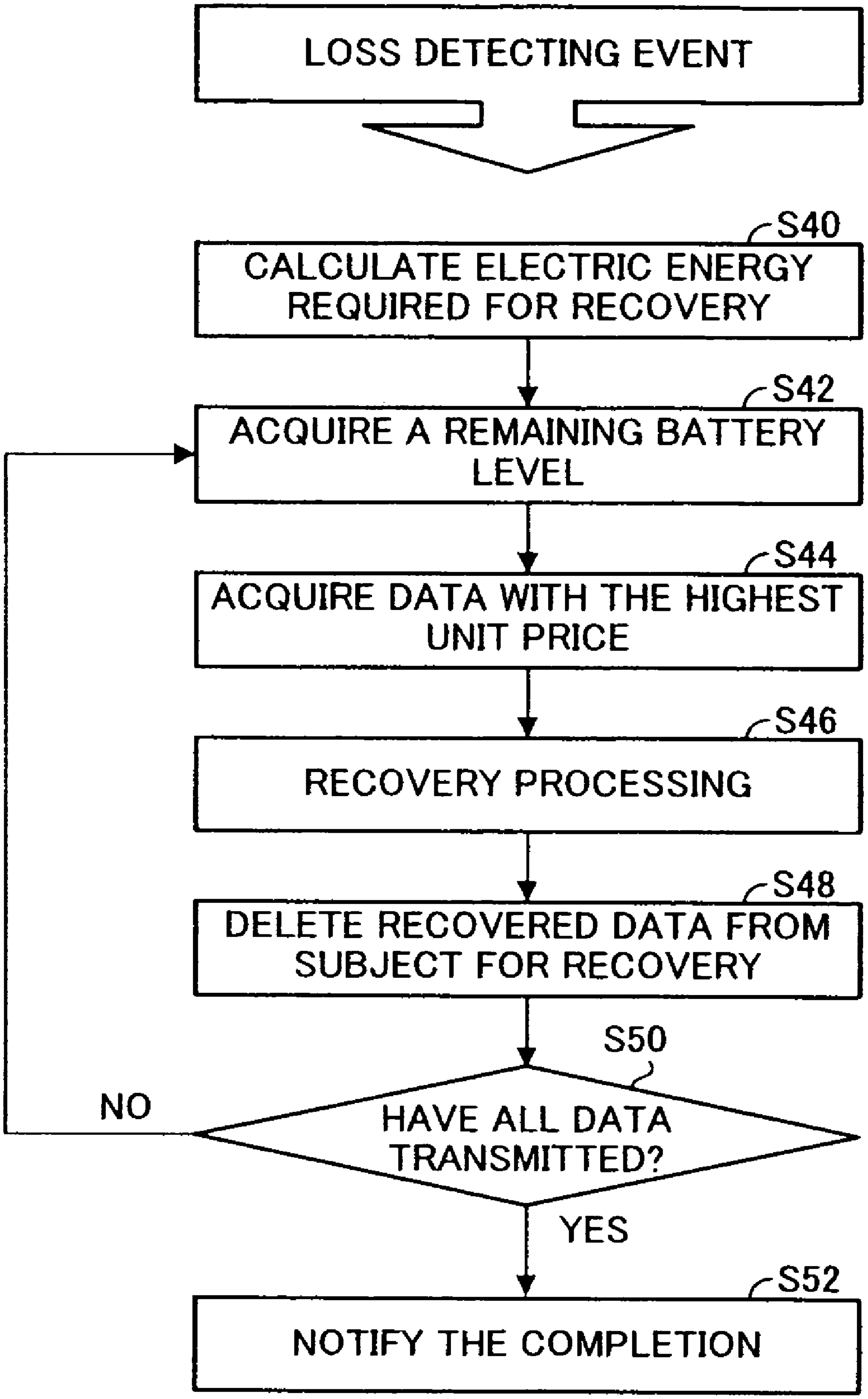
FIG. 8 is a flowchart describing data recovery procedures (No. 2) according to the second embodiment.

Data recovery according to the second embodiment can be followed in accordance with the flowchart shown in FIG. 8. First, reference is made to the power consumption table 104 and a calculation is made (Step S40) as to the estimated value of the electrical energy required to recover the data stored in the data retainer 116. Subsequently, the remaining battery power level is acquired (in Step S42) using the remaining battery power level meter 108. Next, data transmittable within the range of the remaining level of the battery 110 having the highest value assessment index per electrical energy (unit price) required for recovery is selected (Step S44). The selected data is extracted from the data retainer 116 and transmitted (Step S46) to another terminal via the data transmitter 109.

Next, updating the value information retainer 115 excludes the transmission completed data from the subject for recovery (Step S48). Under these circumstances, the transmission completed data can be deleted from the data retainer 116. Then, reference is made to the value information retainer 115 and a determination is made (Step S50) as to whether there is existent data subject to recovery, i.e., whether data subject to recovery have entirely been transmitted. If there is remaining untransmitted data, the process returns to Step S42 and recovery processing continues.

In the meantime, if there is no existent untransmitted data, notification is made of recovery completion to the other terminal via the data transmitter 109 and the processing is completed (Step S52). The completion notification includes information relating to recovery processing such as a list of transmitted data.

C. Third Embodiment

Next, the third embodiment of the present invention will be described.

C-1. Configuration in the Third Embodiment

Figure 9:
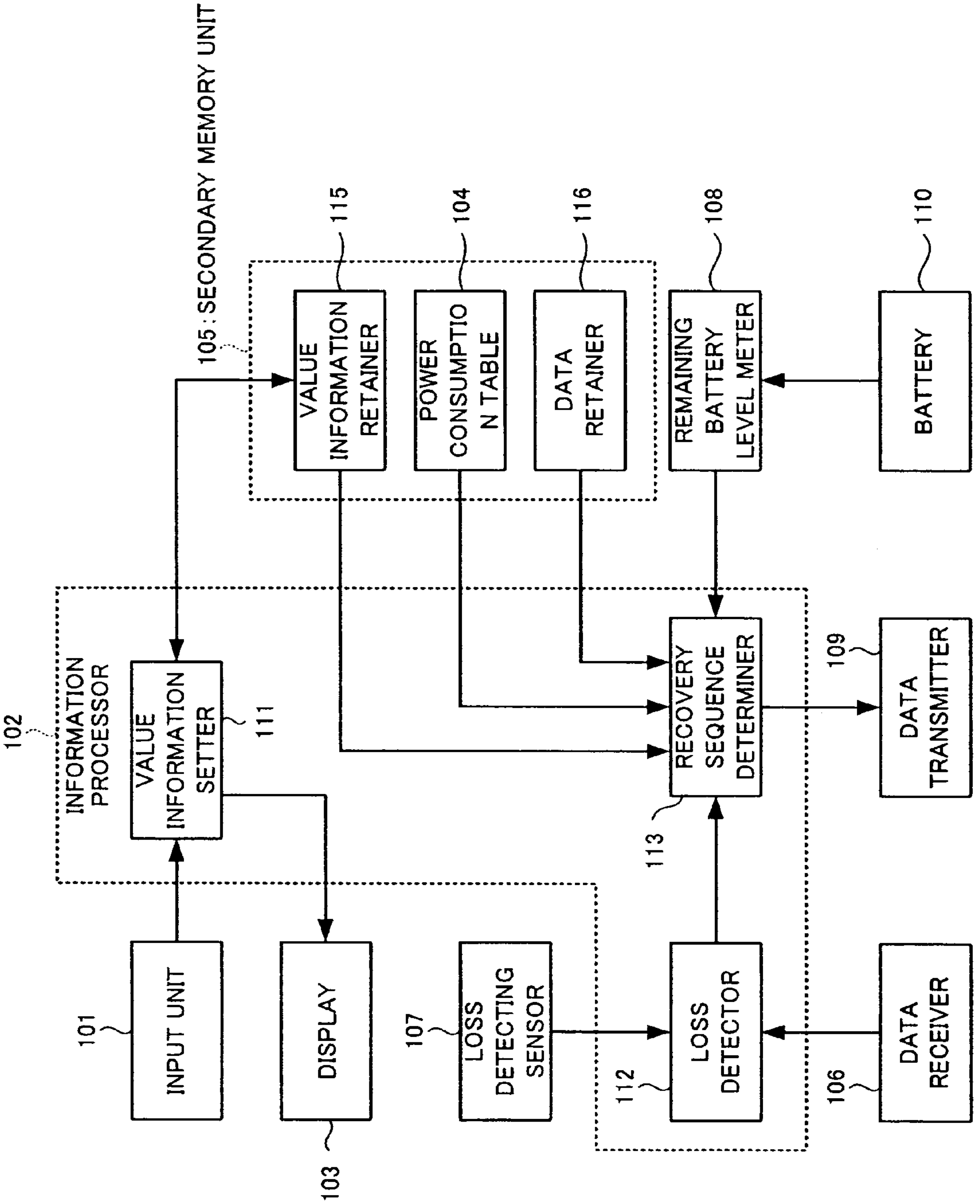
FIG. 9 is a block diagram showing the configuration of a PDA according to the third embodiment of the present invention.
Figure 10A:
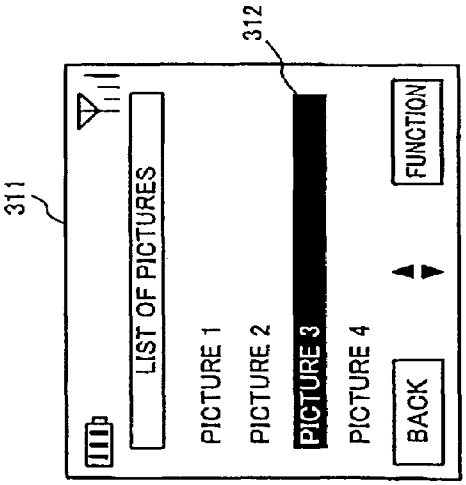
FIGS. 10A~10D are pattern diagrams showing a series of screen transitions shown on a display 103 when setting an amount of money from a data list display screen, respectively.
Figure 10B:
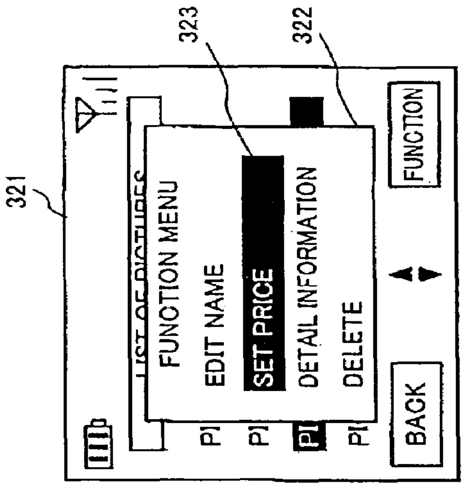
Figure 10C:
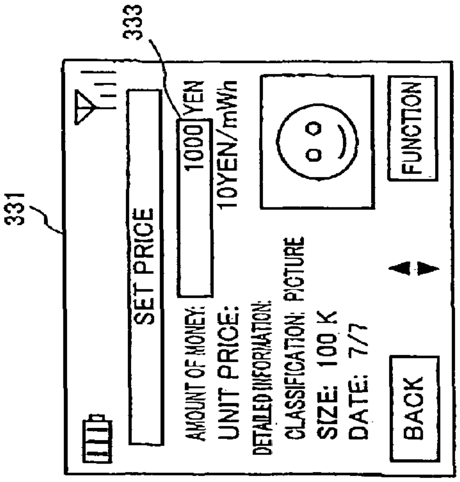
Figure 10D:
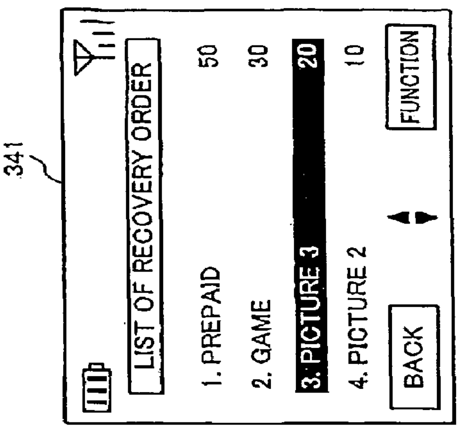

FIG. 9 is a block diagram showing the configuration of a PDA according to the third embodiment of the present invention. Furthermore, components corresponding to those in FIG. 1 and FIG. 4 are marked with the same symbols and their descriptions are omitted. In FIG. 9, input unit 101 enables a user to conduct an operation. Display 103 presents information to a user. Value information setter 111 sets a value assessment index for data whose value is difficult to determine when data, such as an image, is created or saved. For data having a pecuniary value such as electronic money, a value assessment index is appended based on the balance. For purchased data, a value assessment index is appended based on the amount of money at the time of purchasing or the current price. The input results of the value assessment index are stored in the value information retainer 115 within the secondary memory unit 105.

Furthermore, although the value information setter 111, the recovery sequence determiner 113 and the loss detector 112 are respectively expressed as independent blocks within information processor 102, they may be a single program when actualized as software. Since the procedures of the data recovery in the third embodiment are the same as those in the second embodiment, the descriptions are omitted.

Hereinafter, a case of performing setting procedures of a value assessment index for an amount of money from a display screen data list which is related to data that is difficult to determine a value automatically at the time of data creation or storage such as an image and a case where setup is performed from a priority sequence list display screen indicating the data priority in descending order from highest to lowest unit price (that is, the list is arranged with subsequent data in the lowest priority and carries out ranking attachments from the highest priority of a unit price) which is a value assessment index per electrical energy required for recovery will be explained.

The setting procedures of an amount of money from the display screen data list are initially described in detail with reference to FIGS. 10A~10D. FIGS. 10A~10D comprise pattern diagrams showing a series of screen transitions shown on the display 103 when an amount of money is set from a data list display screen. A list of data names is displayed on a screen 311 shown in FIG. 10A. A user operates a cursor 312 (highlighted rectangular region) using the input unit 101 and selects the data to which a value assessment index will be appended. After selection, the screen is changed to the next screen 321 shown in FIG. 10B.

A list of operations 322 carried out on the selected data is displayed on screen 321 and the operation of a cursor 323 using the input unit 101 results in the instruction to append a value assessment index (a price is added) to the selected data. After instruction, the screen is changed to the next screen 331 shown in FIG. 10C.

An entry screen for the value assessment index is displayed on the screen 331. The user enters a numerical value to the numerical value entry field 333 using input unit 101 and sets an amount of money. In this case, an operation index that is arithmetically processed of the totaled value for each type of operation (such as browsing, background picture setup, title modification, etc.) is calculated by the number of times of operation in relation to data contrasted with data respectively that is already to be recovered. The operation index of selected data is multiplied by the average of the value assessment index per every operation index and the value is set as the default of the numerical value entry field 333 prior to input. More specifically, the average of the value assessment index per every operation index is calculated. Next, the calculated average value is multiplied by the operation index of the selected data. Next, the result value (the above-mentioned multiplication value is set up prior to an input as the default of the numerical value entry field 333. The determination instruction results in changing to the next screen 341 shown in FIG. 10D. After a value assessment index setup, a priority sequence list index is displayed on the screen 341 and the user can confirm the relative relationship between the setup data of the value assessment index and other data.

The setting procedures of an amount of money from a priority sequence list on the screen are described in detail hereafter with reference to FIGS. 11A~11D. FIGS. 11A~11D are pattern diagrams showing a series of screen transitions on the display 103 when the amount of money is set from the priority sequence list on the screen. A data priority sequence list is displayed along with a value assessment index (unit price) on screen 411 shown in FIG. 11A. The user operates a cursor 412 using the input unit 101 and selects data of which the priority sequence of which will be changed. After selection, the screen is changed to the next screen 421 shown in FIG. 11B.

Figure 11A:
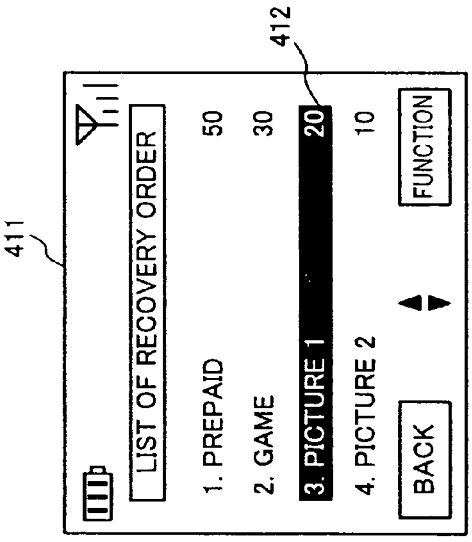
FIGS. 11A~11D are pattern diagrams showing a series of display transitions shown on the display 103 when setting an amount of money from a priority sequence list display screen.
Figure 11B:
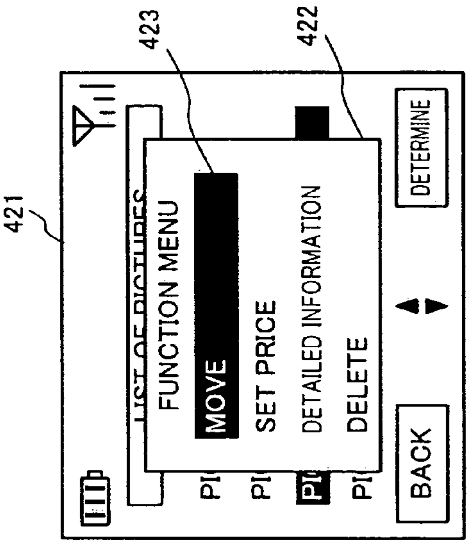
Figure 11C:
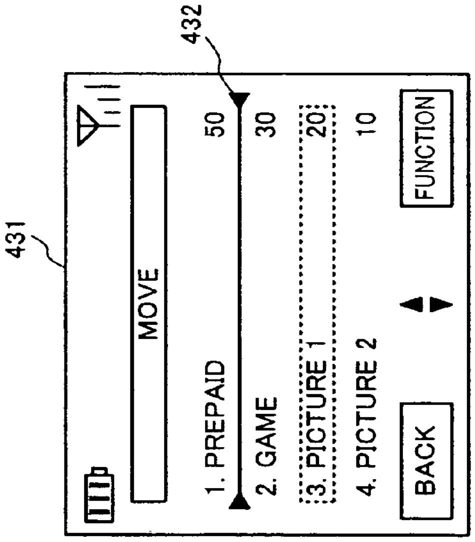
Figure 11D:
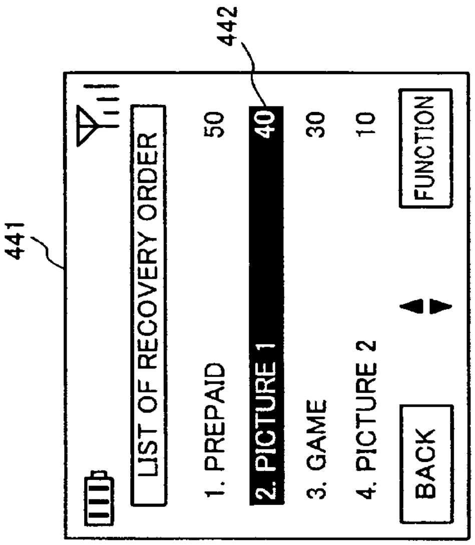

An operation list 422 for the selected data is displayed on the screen 421. The user operates a cursor 423 using the input unit 101 and provides an instruction to change the priority sequence of the selected data. After selection, the screen is changed to the next screen 431 as shown in FIG. 11C.

A list of the data priority sequences is displayed along with the unit prices on the screen 431. The user operates a cursor 432 using the input unit 101 and determines to which position the selected data is to be inserted. Simultaneously, a data unit price 442 is determined for insertion to maintain in the list the order of priority sequences. Since the unit price is a value assessment index per the amount of electrical energy required for recovery, the change of the unit price also results in a change of the value assessment index. In this instance, an average value of data before and after the data insertion is regarded as the unit price of the inserted data. After the determination, the screen is changed to the next screen 441 shown in FIG. 11D. A list of the priority sequences after setting the value assessment index is displayed on the screen 441 and the user can confirm a relative relationship between the selected data and other data.

Figure 12A:
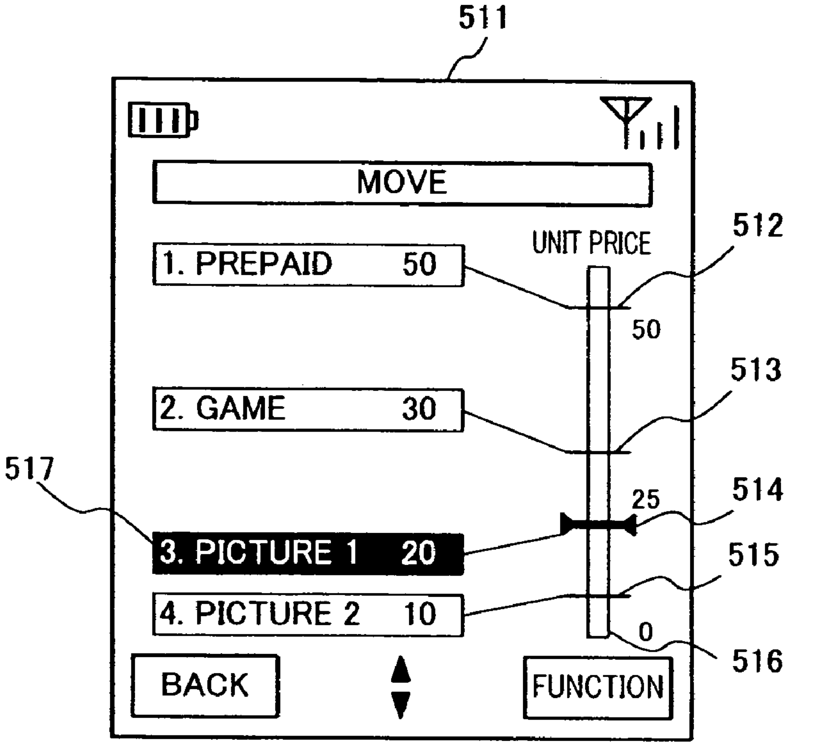
FIGS. 12A~12B are pattern diagrams of a display shown on the display 103 when setting an amount of money using a numerical value input bar from a priority sequence list on the screen.
Figure 12B:
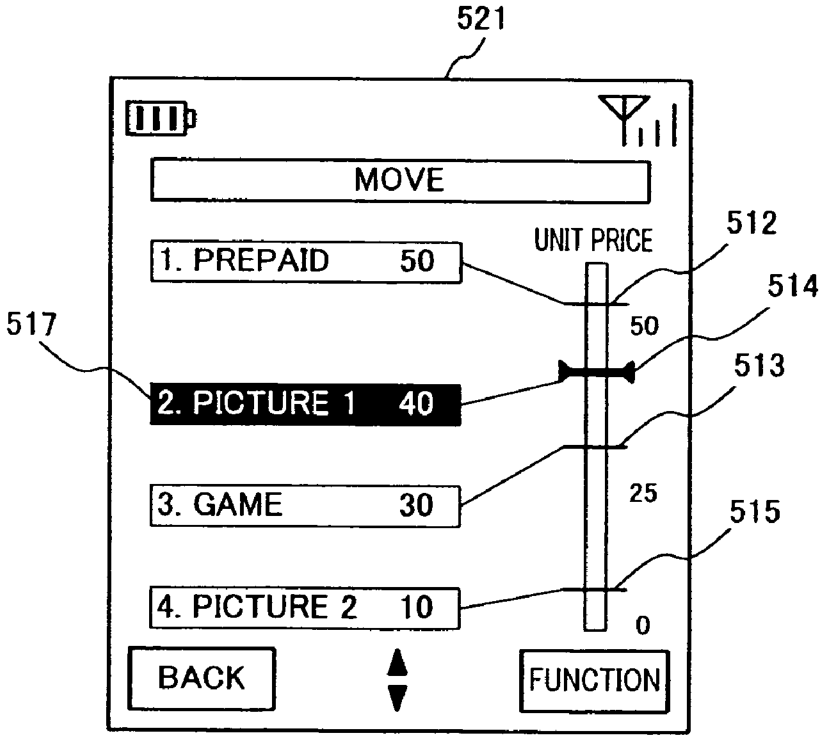

Another example of procedures to set an amount of money from a priority sequence list on the screen is described in detail hereafter with reference to FIGS. 12A-12B. The data priority sequence is displayed along with the unit prices on a screen 511 as shown in FIG. 12A where all data relating to lines 512 to 515 indicate the unit prices on the line number 516. A user operates a cursor 517 using the input unit 101 and selects one line (514) among the lines 512 to 515 indicating the unit prices. After the selection, the user operates the input unit 101 and moves the line 514 indicating the unit price on a number line 516 which adjusts the unit price. A result of moving the line 514 is the indication of the unit price on the position '40' on the number line 516 which display on the screen 521 as shown in FIG. 12B. Since the unit price is a value assessment index per amount of electrical energy required for recovery, the change in the unit price also results the in changing the value of the evaluation index.

In the above-mentioned explanation, although picture data was described as an example, data of other types, such as sound or text, is similarly processed.

D. Fourth Embodiment

Next, the fourth embodiment of the present invention will be described. The fourth embodiment is basically similar to the third embodiment such as when an operation is performed on the data in a PDA, a function is added to update a value assessment index and a recovery flag retained in the value information retainer 115. This function is described hereafter with reference to a specific example.

When the data in a PDA is transmitted to another terminal via electronic mail, because the data is duplicated outside of the PDA, a process is performed such as reducing the value assessment index according to a destination or canceling the recovery designation. For example, if it can be determined that the transmission end is a mailbox destination belonging to a user, the data is eliminated from the subject for recovery. In the meantime, if it can be determined that the destination terminal at the other side is another PDA, processing, such as reducing the value assessment index for the data to a predetermined value or by a ratio, is performed or processing to be executed can be selected by a user.

The transmission medium is not always electronic mail but can be a method to transfer data by direct connection between a PDA and a PC using a communications cable. In this case, the other side is uniquely specifiable and the recovery designation is automatically cancelled relative to the data transferred to the PC. Other than a PC, data can be duplicated using a detachable medium such as non-versatile memory.

When an operation considered as referring to data is performed, processing is performed to increase the value assessment index according to the number of times reference is made to the value assessment index or the reference time period. In addition, processing is performed to designate the data as a subject for recovery. As operations considered as referring to data, reference is made to browsing data, such as text or pictures, playing sound data, setting and displaying picture data as background, setting to play sound data as sound of receiving an electronic mail or a phone call or playing the set data.

E. Fifth Embodiment

Hereinafter, the fifth embodiment of the present invention will be described.

E-1. Configuration in Fifth Embodiment

Figure 13:
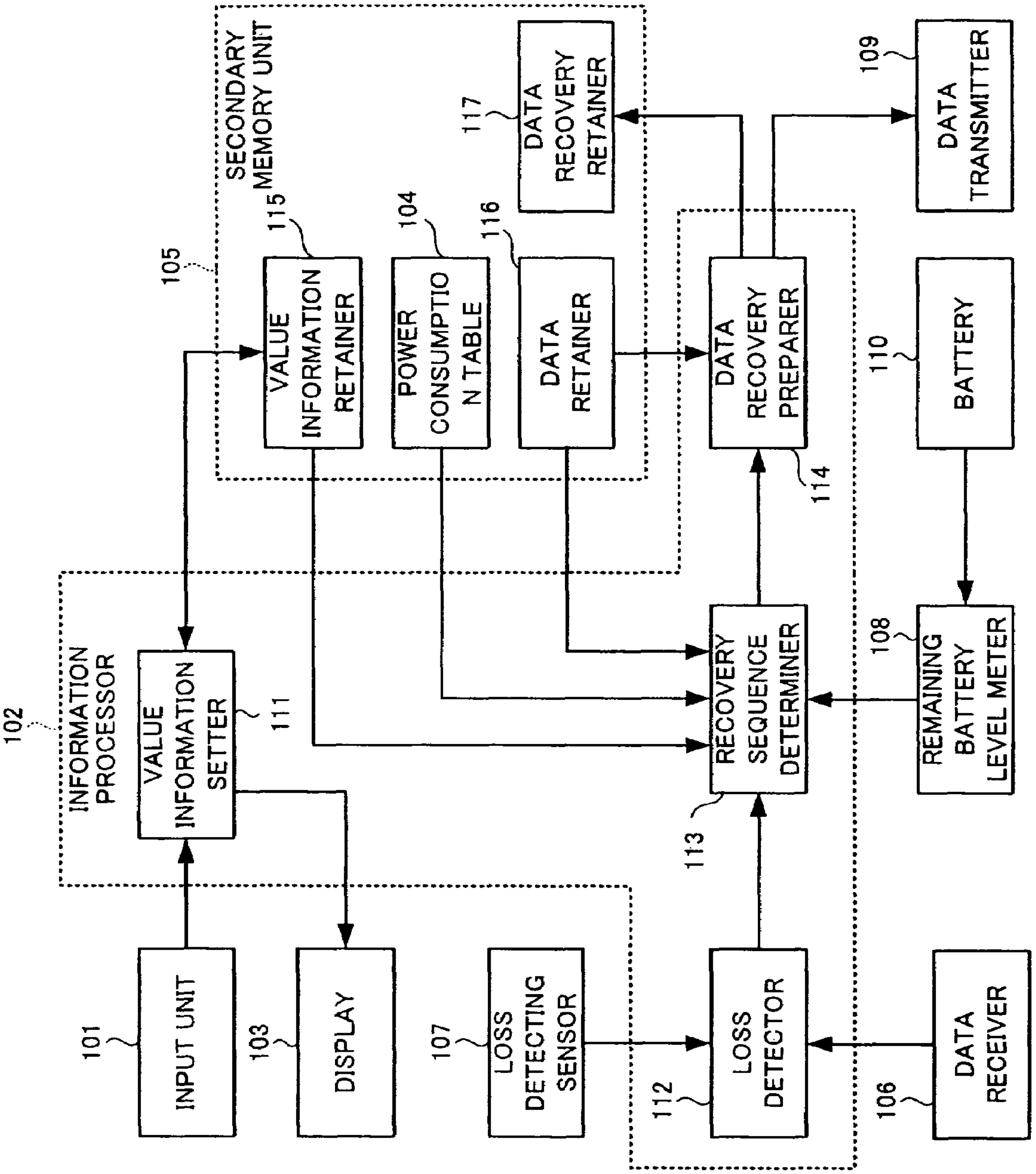
FIG. 13 is a block diagram showing the configuration of a PDA according to the fifth embodiment of the present invention.

FIG. 13 is a block diagram showing the configuration of a PDA according to the fifth embodiment of the present invention. Components corresponding to those in FIG. 1 are marked with the same symbols and their descriptions are omitted. In FIG. 13, when a user designates one data as a subject for recovery instead of the data stored in the data retainer 116, a data recovery preparer 114 prepares the data to be recovered in advance in the case of the loss of the PDA. For example, when the battery 110 is charged, the data for recovery can be prepared by prioritizing data with a higher priority sequence.

The value information retainer 115 is a table for retaining metadata relating to a value for data stored in the data retainer 116, and as shown in FIG. 14, is composed of a data name, data classification, a recovery flag indicating whether the data is a subject for recovery, a value assessment index, size and a compression parameter per data subject for recovery.

Further, the power consumption table 104 is, as shown in FIG. 15, composed of data classification, basic electrical energy, electrical energy per size, electrical energy required for the preparation of data for recovery (decompression) and electrical energy required for the preparation of data for recovery (compression). Furthermore, the electrical energy required for recovery is a sum of a basic electrical energy which is a value where the electrical energy per size is multiplied by the size of the data for recovery, a value where the electrical energy required for the data for recovery preparation (decompression) is multiplied by the size of the original data and a value where the electrical energy required for the data for recovery preparation (compression) is multiplied by the size of the data for recovery. Further, the basic electrical energy and the electrical energy per size retained in the power consumption table 104 are values for taking measurements under specified conditions such as assuming the condition of a channel in a wireless communication means to be excellent. Therefore, prior to the calculation, the values in the power consumption table 104 are respectively multiplied by a coefficient according to the quality of the channel.

Further, data recovery retainer 117 comprises a memory region for retaining the data to be recovered which is prepared by the data recovery preparer 114.

Furthermore, the value information setter 111, the data recovery preparer 114, the recovery sequence determiner 113 and the loss detector 112 are respectively expressed as independent blocks within the information processor 102. However, if they are software, they may be a single program.

E-2. Operation in Fifth Embodiment

Figure 16:
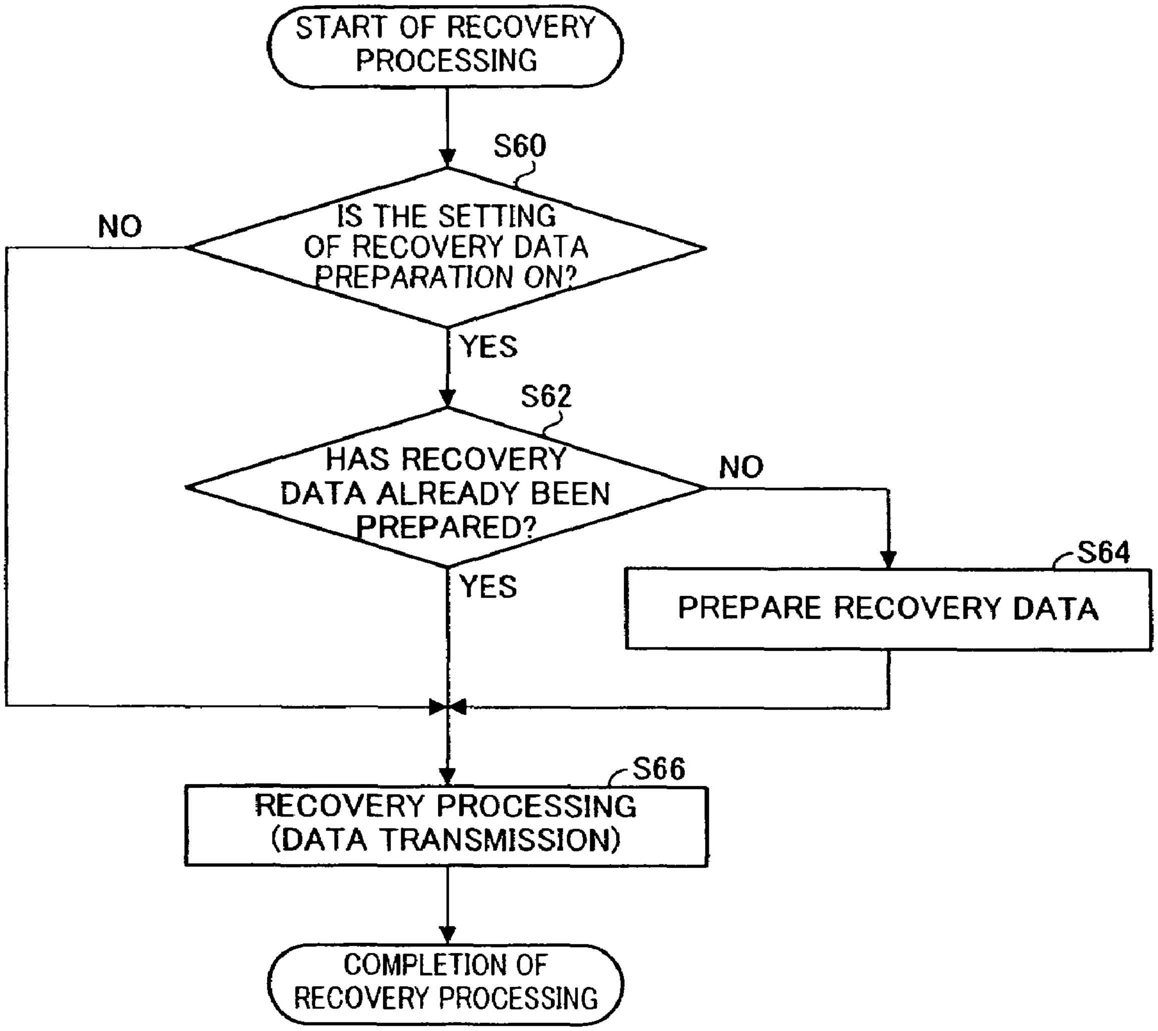
FIG. 16 is a flowchart describing recovery processing procedures according to the fifth embodiment.

Next, the operation according to the fifth embodiment is described. Data recovery according to the fifth embodiment is similar to that of the second embodiment (FIG. 7). However, there is a difference in the point of replacing the recovery processing in Step S28 with the processing shown in FIG. 14. FIG. 16 is a flowchart describing the recovery processing procedures according to the fifth embodiment.

In the fifth embodiment, when the recovery processing is executed, the data recovery preparer 114 determines whether the setting of the data for recovery preparation is "ON" (Step S60). If the setting of the data for recovery preparation is not "ON" as in the second embodiment, the data retained in the data retainer 116 is transmitted to another terminal via the data transmitter 109 by following the determined recovery sequence (Step S66).

In the meantime, if the setting of the data for recovery is "ON," a determination is made as to whether data for recovery exists in the data recovery retainer 117 (Step S62). If data for recovery does exist, as with the second embodiment, the data retained in the data recovery retainer 117 is transmitted to another terminal via the data transmitter 109 by following the determined recovery sequence (Step S66).

In the meantime, if no data for recovery exists, data for recovery is prepared (Step S64) For example, if the data has already been compressed, the compressed data is decompressed in memory and the data is recompressed according to compression parameters (such as, resolution and ratio of compression) obtained by referring to the value information retainer 115 and is designated as a subject for transmission. Then, the data retained in the data recovery retainer 117 is transmitted to another terminal via the data transmitter 109 by following the determined recovery sequence (Step S66).

F. Sixth Embodiment

The sixth embodiment of the present invention is basically similar to the third embodiment and is characterized by the fact that a value for the data is evaluated based on a value where a value according to cost required for the transmission via the transmitter (wireless transmission means) 109 is subtracted from a value assessment index. Specifically, the cost required for the data transmission is estimated, a value calculated based on the estimated cost is subtracted from the value assessment index in the value information retainer 115 and data recovery processing shown in FIG. 7 or FIG. 8 is performed.

While the present invention has been described with reference to the preferred embodiments, it is intended that the invention be not limited by any of the details of the description therein but includes all the embodiments which fall within the scope of the appended claims.

What is claimed is:

1. A battery-driven personal digital assistant which wirelessly communicates with other terminals, comprising:

a memory means for storing data;

a loss detection means for detecting whether the personal digital assistant is in a lost state;

a value information retention means for retaining a value assessment index indicating values of data stored in the memory means;

a recovery sequence determination means for determining a recovery sequence of data stored in the memory means based on the value assessment index retained in the value information retention means when the lost state is detected by the loss detection means;

a transmission means for transmitting data stored in the memory means to another terminal based on the recovery sequence determined by the recovery sequence determination means;

a remaining battery power level measurement means for measuring remaining battery power level; and a consumption power retention means for retaining consumption power required for data transmission;

wherein the recovery sequence determination means determines the recovery sequence of data stored in the memory means based on the remaining battery power level measured by the remaining battery power level measurement means, the consumption power retained in the consumption power retention means and the value assessment index retained in the value information retention means.

2. The personal digital assistant according to claim 1, wherein the recovery sequence determination means by solving a knapsack problem, which sets in order, the remaining battery power level measured by the remaining battery measurement means as a capacity, the power consumption retained in the power consumption retention means as a weight and the value assessment index for data retained in the value information retention means as the value.

3. The personal digital assistant according to claim 2, wherein the recovery sequence determination means determines whether a difference between the remaining battery power level measured by the remaining battery power level measurement means and an estimated remaining battery power level obtained from the power consumption retained in the power consumption retention means exceeds a specified value for each data transmission, and when the difference between the remaining battery power level measured by the remaining battery power level measurement means and the estimated remaining battery power level obtained from the power consumption retained in the power consumption retention means exceeds a specified value the recovery sequence is recalculated.

4. The personal digital assistant according to claim 1, wherein the recovery sequence determination means determines an order of data recovery by using in descending order from highest to lowest unit price of the value assessment index per electrical energy required for recovery which is transmittable within a range of the remaining battery power level measured by the remaining battery power level measurement means.

5. The personal digital assistant according to claim 1, further comprising:

a value information setting means which sets the value assessment index for data stored in the memory means based on user instructions.

6. The personal digital assistant according to claim 5, wherein the value information setting means sets an entered numerical value relating to selected data as the value assessment index.

7. The personal digital assistant according to claim 5, further comprising:

a data priority sequence list in which an order of ordered data is replaceable based on the value assessment index;

wherein the value information setting means sets the value assessment index for data based on the order of replaced data to the data priority sequence list.

8. The personal digital assistant according to claim 5, wherein the value information setting means arithmetically calculates an operation index of a totaled value for each type of operation by a number of times of operation in relation to data contrasted with data respectively that is already to be recovered, wherein the operation index of selected data is multiplied by an average of the value assessment index per every operation index and set as a default value prior to input.

9. The personal digital assistant according to claim 5, wherein when data has a pecuniary value, the value information setting means calculates the value assessment index based on the pecuniary value.

10. The personal digital assistant according to claim 5, wherein the value information setting means increases or decreases the value assessment index based on details of operations relative to data.

11. The personal digital assistant according to claim 10, wherein when transmitting data the value information setting means increases or decreases the value assessment index of data based on transmission destination.

12. The personal digital assistant according to claim 5, wherein the value information setting means updates the value assessment index based on a value of a subtracted value corresponding to cost required for transmission from the value assessment index.

13. The personal digital assistant according to claim 1, further comprising:

a data recovery preparation means for advance preparation of data for recovery which is to be recovered when a lost state is detected from data stored in the memory means based on the recovery sequence determined by the recovery sequence determination means; and a data recovery retention means for retaining data for recovery;

wherein the transmission means transmits data for recovery stored in the data recovery retention means to another terminal when the lost state is detected.

14. The personal digital assistant according to claim 13, further comprising:

a compression means which compresses data for recovery with a predesignated compression ratio when data for recovery subject for transmission is compressible.

15. A data recovery method for recovering data within a personal digital assistant by wirelessly transmitting data to another terminal when in a lost state, comprising the steps of:

determining, at a recovery sequence determination means of the personal digital assistant, a data recovery sequence based on a value assessment index indicating data values when detected in the lost state; and transmitting, from a transmission means of the personal digital assistant, data to another terminal based on the determined recovery sequence;

wherein the recovery sequence of data is determined based on remaining battery power level, power consumption required for data transmission and the value assessment index.

16. The data recovery method according to claim 15, wherein a knapsack problem is solved to set in order the remaining battery power level as capacity, the power consumption as a weight and the value assessment index as the value.

17. The data recovery method according to claim 16, wherein a determination is made as to whether a difference between the remaining battery power level and an estimated remaining battery power level obtained from the power consumption exceeds a specified value for each data transmission, and when the difference between the remaining battery power level and the estimated remaining battery power level obtained from the power consumption exceeds a specified value the recovery sequence is recalculated.

18. The data recovery method according to claim 15, wherein an order of data recovery is performed as a highest order of the value assessment index per electrical energy required for recovery which is transmittable within a range of the remaining battery power level.

19. The data recovery method according to claim 15, wherein the value assessment index is settable by entering a numerical value to selected data.

20. The data recovery method according to claim 19, wherein the personal digital assistant comprises a data priority sequence list in which an order of ordered data is replaceable based on the value replacement index, and wherein the value assessment index is set based on the order of replaced data to a data priority sequence list.

21. The data recovery method according to claim 19, wherein an operational index of the totaled value for each type of operation is arithmetically calculated by number of times of operation in relation to data contrasted with data respectively that is already to be recovered, wherein the operation index of selected data is multiplied by an average of the value assessment index per every operation index and set as a default value prior to input.

22. The data recovery method according to claim 19, wherein when data has a pecuniary value, the value assessment index is calculated based on the pecuniary value.

23. The data recovery method according to claim 19, wherein the value assessment index increases or decreases based on the details of operations relative to data.

24. The data recovery method according to claim 23, wherein when transmitting the value assessment index increases or decreases based on transmission destination.

25. The data recovery method according to claim 19, wherein the value assessment index is updated based on a value of a subtracted value corresponding to a cost required for transmission from the value assessment index.

26. The data recovery method according to claim 19, wherein data for recovery to be recovered from data is prepared in advance when a lost state is detected based on a determined recovery sequence, wherein upon detection of a lost state data for recovery will be transmitted to another terminal.

27. The data recovery method according to claim 26, wherein data for recovery is compressed with a predesignated compression ratio when data for recovery subject for transmission is compressible.

* * * * *